J. M. BELL.
PORTABLE SOLDERING DEVICE.
APPLICATION FILED AUG. 7, 1917.
1,272,358.
Patented July 16, 1918.
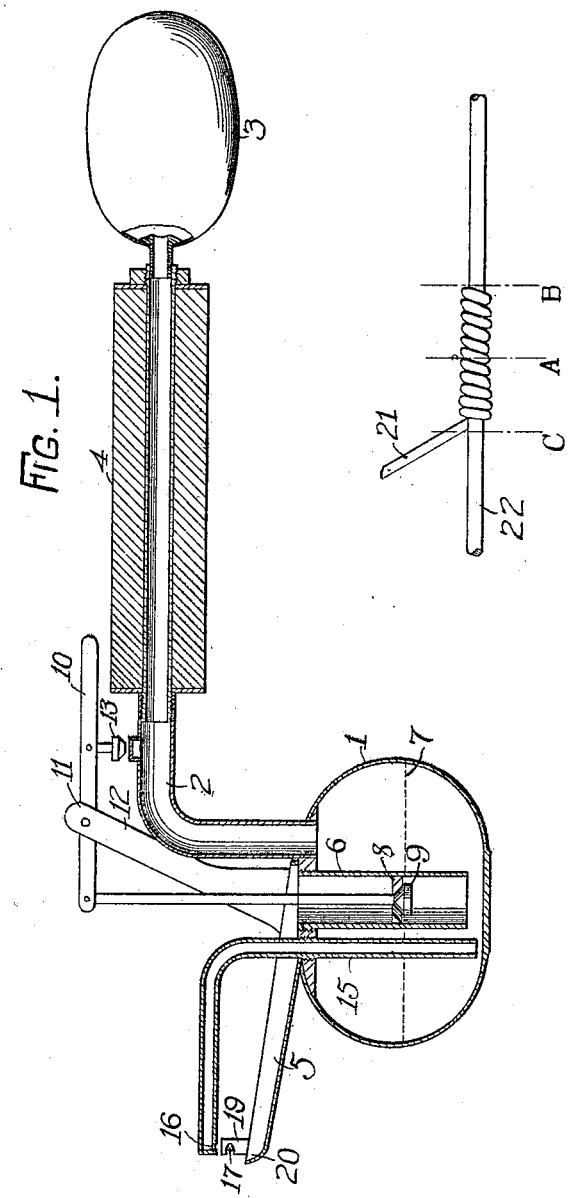
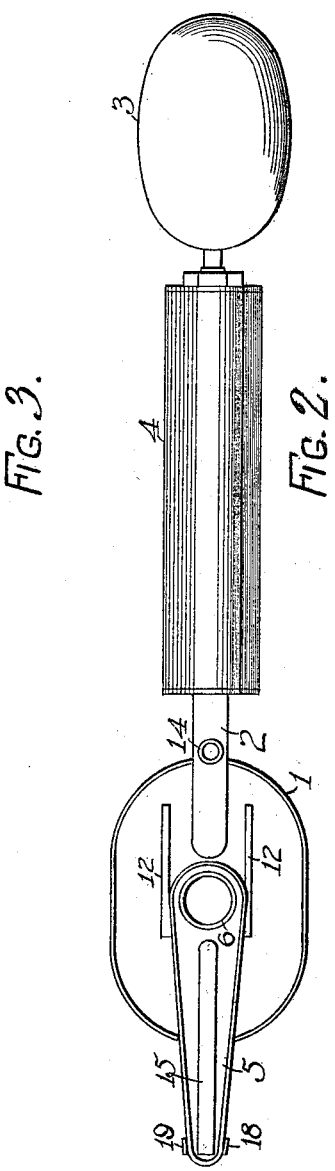
Inventor
J. M. Bell
By  H. R. Vandeventer
Attorney

UNITED STATES PATENT OFFICE.

JOHN MONTGOMERY BELL, OF CHESTER, SOUTH CAROLINA.

PORTABLE SOLDERING DEVICE.

1,272,358.  Specification of Letters Patent.  Patented July 16, 1918.

Application filed August 7, 1917. Serial No. 184,886.

*To all whom it may concern:*

Be it known that I, JOHN MONTGOMERY BELL, a citizen of the United States, residing at Chester, in the county of Chester and State of South Carolina, have invented certain new and useful Improvements in Portable Soldering Devices, of which the following is a specification, reference being had to the accompanying drawing.

This invention relates to a portable apparatus for soldering, and particularly for soldering joints in telephone, telegraph and other wires when the solder must be applied to a portion only of the joint. Such joints are commonly made in connection with "cut ins" on telephone lines.

A further object is to eliminate the waste of solder occurring when other methods of applying the same to the joint are employed.

A further object is to provide a simple and efficient portable soldering device combining the necessary closed solder reservoir, the air pump mechanism connected thereto, and the other parts hereinafter described.

In my U. S. Patent #1,203,465, dated October 31, 1916, I have described and claimed a soldering apparatus in which air pressure is employed to cause the molten solder to flow about the parts to be soldered, and the present invention comprises certain improvements in the said apparatus that will better adapt it for special purposes hereinafter described, and which are obvious from a study of this specification.

In the accompanying drawing in which like figures of reference denote the same parts wherever they are shown, Figure 1, is a sectional view of the apparatus constituting my invention. Fig. 2, a view looking down on the top of same with the lever 10, together with the valve members 9 and 13 removed. Fig. 3, is a view of a cut in joint adapted to be soldered in the manner hereinafter described, employing the apparatus shown in Figs. 1 and 2.

The numeral 1 denotes a cylindrical chamber adapted to receive solder. 2 is an air tube connecting the chamber 1 with the rubber bulb 3. This tube passes through the wooden handle 4. The bulb 3 may be replaced by any suitable pump adapted to furnish air under pressure. 5 is an open trough on top of the chamber 1, and 6 is a tube connected with the trough 5 and communicating with the solder contained in the chamber 1 up to the dotted line 7. 8 is a valve seat through which molten solder may pass and 9 is a valve adapted to close the pipe 6, this being closed by pressing on the handle 10 pivoted as shown at 11 on one of the upright members 12 which is suitably secured to the device. An air release valve is indicated at 13 and 14, the same communicating with the tube 2. The chamber 1 is placed on a plumber's fire pot long enough to heat the solder. The handle 4 is grasped in one hand letting the thumb press down on the lever 10, thereby closing the air valve 13, 14 and also closing the metal valve 8, 9. Bulb 3 is now pressed which places air pressure on top of the molten metal, causing the same to flow upwardly through tube 15 and out at the orifice 16 and on to the work indicated at 17. Suitable guides 18 and 19 are placed on each side of the trough 5 so that the wire or other articles to be soldered may be properly positioned under the orifice 16. The surplus solder falls into the extended portion 20 of the trough 5, runs down the trough and into the tube 6, and when pressure on the handle 10 is released the metal valve 8, 9 and air valve 13, 14 open and the molten metal passes through the metal valve 8, 9 returning to the chamber 1.

It will be seen from the foregoing description that the molten solder by means of this apparatus may be ejected downwardly on the work at any desired angle, and that by sliding the device along a joint, the entire joint may be covered with solder or only that portion of the joint between the line A B, Fig. 3, may be soldered, leaving the portion of the cut in wire 21 from A to C merely coiled about the main line wire indicated at 22, which gives a spring effect not present if the entire coil portion of 21 is soldered about 22.

It is very difficult to solder only a portion of the joint by any other means of which I am now aware, and while I have shown one form of the device adapted to solder line wires and equipped with manually operated pump and valves, it will be understood that I do not confine myself to the precise arrangement herein disclosed, but consider my invention to broadly embrace all of the obvious mechanical modifications that can be made therein without, however, departing from the appended claims.

Having thus described my invention, I claim:

1. A soldering apparatus comprising a reservoir for solder, a passage communicating therewith, a valve in said passage adapted when opened to permit molten solder to flow therethrough, means for applying air pressure to said reservoir, and a second passage communicating with said reservoir and having an orifice through which molten solder may be ejected.

2. A soldering apparatus comprising a reservoir for solder, a passage communicating therewith, a valve in said passage adapted when opened to permit molten solder to flow therethrough, means for applying air pressure to said reservoir, a second passage communicating with said reservoir and having an orifice through which molten solder may be ejected and a member underneath said orifice adapted to conduct molten solder to said first mentioned passage.

3. A soldering apparatus comprising a reservoir for solder, a passage communicating therewith, a valve in said passage adapted when opened to permit molten solder to flow therethrough, means for applying air pressure to said reservoir, a second passage communicating with said reservoir and having an orifice through which molten solder may be ejected, a member underneath said orifice adapted to conduct molten solder to said first mentioned passage and means supported by said member for positioning the work to be soldered under said orifice.

4. A soldering apparatus comprising a reservoir for solder, a passage communicating therewith and extending therefrom, means for producing air pressure connected to said passage, a valve in said passage, a second passage communicating with said reservoir, a valve in said second passage and common means for operating both said valves.

5. A soldering apparatus comprising a reservoir for solder, a tube communicating with the upper portion of said reservoir and extending outwardly therefrom, a heat insulating handle about said tube, means for applying air pressure connected to said tube, a valve in said tube whereby pressure in same may be controlled, a second tube connected to said reservoir the lower end of which is adapted to extend into molten solder, said tube having an orifice through which molten solder may be ejected, and a third tube communicating with said reservoir and having a valve therein, substantially as described.

6. A soldering apparatus comprising a reservoir for solder having means for applying air pressure connected therewith, a pressure release valve for the air pressure, a valve adapted to permit molten solder to flow therethrough in said reservoir and a delivery tube communicating with said reservoir and having an orifice through which molten solder may be forced by said air pressure, substantially as described.

7. A soldering apparatus comprising a reservoir for solder, means for applying air pressure having a tube communicating therewith, said tube forming a handle, a valve in said tube whereby the air pressure therein may be controlled, an opening in said reservoir and a valve in said opening, a trough communicating with said valve, a tube communicating with the lower portion of said reservoir, said tube having an orifice through which solder may be ejected, said valve being closed and air pressure being applied by said means, substantially as described.

8. A soldering apparatus comprising a reservoir for solder, means for applying air pressure communicating with the upper portion thereof, a valve for controlling the air pressure in said reservoir, a tube communicating with said reservoir and adapted to conduct molten solder outwardly therefrom, said tube having an orifice, a trough positioned adjacent said orifice, said trough having work positioning guides thereon adapted to position the work to be soldered, and a connection between said trough and said reservoir, said connection being valve controlled, substantially as described.

9. A soldering apparatus comprising a reservoir for solder and means for applying air pressure to the upper portions thereof, a downwardly extending tube in said reservoir, the lower end of which is near the bottom thereof, the upper portion of said tube extending outwardly from the reservoir in a lateral direction, an orifice at the outer end of said tube and directed downward, a trough underneath said orifice, a connection between said trough and said reservoir and a valve in said connection, a second valve communicating with the upper portion of said reservoir, means for mechanically operating said valves in unison and a handle adjacent said operating means.

10. A soldering apparatus comprising a reservoir for solder, means for applying air pressure to said reservoir above the solder, a tube communicating with the lower portion of said reservoir and having an orifice through which molten solder may be ejected, a work holder secured to said reservoir and positioned adjacent said orifice, and valve controlled means whereby the flow of molten solder and the air pressure may be regulated, substantially as described.

In testimony whereof I hereunto affix my signature in the presence of two witnesses.

JOHN MONTGOMERY BELL.

Witnesses:
OCEY CORKILL,
M. H. WHITE.